(12) United States Patent
Parida et al.

(10) Patent No.: US 9,482,303 B2
(45) Date of Patent: Nov. 1, 2016

(54) SHOCK ENERGY ABSORBER

(71) Applicant: Foster-Miller, Inc., Waltham, MA (US)

(72) Inventors: Basant K. Parida, Bellingham, MA (US); Norman Dana, Albion, RI (US); Abdullatif K Zaouk, Jamaica Plain, MA (US)

(73) Assignee: Foster-Miller, Inc., Waltham, MA (US)

( * ) Notice: Subject to any disclaimer, the term of this patent is extended or adjusted under 35 U.S.C. 154(b) by 0 days.

(21) Appl. No.: 14/853,302

(22) Filed: Sep. 14, 2015

(65) Prior Publication Data

US 2016/0069413 A1 Mar. 10, 2016

Related U.S. Application Data

(60) Division of application No. 13/385,486, filed on Feb. 22, 2012, now abandoned, which is a continuation-in-part of application No. 12/925,354, filed on Oct. 19, 2010, now Pat. No. 8,820,493.

(60) Provisional application No. 61/281,314, filed on Nov. 16, 2009.

(51) Int. Cl.
*F16F 9/30* (2006.01)
*B61G 11/12* (2006.01)
*F16F 7/00* (2006.01)

(52) U.S. Cl.
CPC ............... *F16F 9/30* (2013.01); *B61G 11/12* (2013.01); *F16F 7/003* (2013.01)

(58) Field of Classification Search
CPC ............ F16F 7/003; F16F 7/12; F16F 7/125; F16F 7/127; F16F 9/30; F16F 9/303; F16F 9/306
See application file for complete search history.

(56) References Cited

U.S. PATENT DOCUMENTS

| 2,997,325 A | 8/1961 | Peterson |
| 3,006,484 A | 10/1961 | Pringiers |
| 3,053,526 A | 9/1962 | Kendall |
| 3,139,290 A | 6/1964 | Swick |
| 3,209,864 A | 10/1965 | Boyd |
| 3,365,189 A | 1/1968 | Carlson |
| 3,659,835 A | 5/1972 | Peterson |

(Continued)

FOREIGN PATENT DOCUMENTS

| DE | 102009029814 B4 | 1/2011 |
| JP | 60252832 A | 12/1985 |

(Continued)

OTHER PUBLICATIONS

Written Opinion of the International Searching Authority for International Application No. PCT/US2010/002793, mailed Dec. 30, 2010 (five (5) pages).

(Continued)

*Primary Examiner* — Nicholas J Lane
(74) *Attorney, Agent, or Firm* — Iandiorio Teska & Coleman, LLP

(57) ABSTRACT

A shock absorber includes damping material in a solid state and which transitions from a solid to a viscous fluid state when stressed and a plunger device including a depending blade positioned in or adjacent the damping material to be driven into the damping material when impacted transitioning the damping material to a viscous fluid state absorbing the impact.

6 Claims, 15 Drawing Sheets

(56) References Cited

U.S. PATENT DOCUMENTS

| | | | |
|---|---|---|---|
| 3,713,641 A | 1/1973 | Kendall |
| 3,741,560 A | 6/1973 | Schaller |
| 3,747,915 A | 7/1973 | Hall |
| 3,773,187 A | 11/1973 | Carlson |
| 3,847,252 A | 11/1974 | Casciola |
| 3,876,044 A | 4/1975 | Kendall et al. |
| 3,913,707 A | 10/1975 | Wastenson et al. |
| 4,040,523 A | 8/1977 | Carle et al. |
| 4,403,012 A | 9/1983 | Harpell et al. |
| 4,778,633 A | 10/1988 | Kiang et al. |
| 5,349,893 A | 9/1994 | Dunn |
| 5,354,605 A | 10/1994 | Lin et al. |
| 5,875,875 A | 3/1999 | Knotts |
| 6,050,211 A | 4/2000 | Yamaguchi |
| 6,135,252 A | 10/2000 | Knotts |
| 6,393,999 B1 | 5/2002 | Schneider |
| 6,477,934 B1 | 11/2002 | Bruhn et al. |
| 6,532,857 B1 | 3/2003 | Shih et al. |
| 6,807,891 B2 | 10/2004 | Fisher |
| 7,255,034 B2 | 8/2007 | Strassgurti et al. |
| 7,806,038 B2 | 10/2010 | Duke |
| 7,845,266 B2 | 12/2010 | Duke et al. |
| 7,908,959 B2 | 3/2011 | Pavon |
| 7,987,762 B2 | 8/2011 | Joynt et al. |
| 7,997,181 B1 | 8/2011 | Tunis et al. |
| 7,997,182 B1 | 8/2011 | Cox |
| 8,033,208 B2 | 10/2011 | Joynt et al. |
| 8,146,477 B2 | 4/2012 | Joynt |
| 8,418,597 B2 | 4/2013 | Pavon |
| 2004/0206591 A1 | 10/2004 | Smelser |
| 2006/0013977 A1 | 1/2006 | Duke et al. |
| 2007/0144337 A1 | 6/2007 | Zhang et al. |
| 2008/0090933 A1 | 4/2008 | Muratoglu et al. |
| 2008/0111396 A1 | 5/2008 | Barbe et al. |
| 2009/0065462 A1 | 3/2009 | Gansweidt |
| 2010/0170386 A1 | 7/2010 | Bhatnagar et al. |
| 2010/0173117 A1 | 7/2010 | Duke et al. |
| 2010/0307327 A1 | 12/2010 | Gettie |
| 2010/0307329 A1 | 12/2010 | Kaswen et al. |
| 2011/0114427 A1 | 5/2011 | Parida et al. |
| 2011/0148147 A1 | 6/2011 | Tunis et al. |
| 2011/0169240 A1 | 7/2011 | Schreiner et al. |
| 2011/0259185 A1 | 10/2011 | Berning et al. |
| 2012/0055324 A1 | 3/2012 | Pepka |
| 2012/0152098 A1 | 6/2012 | Howland et al. |
| 2012/0204711 A1 | 8/2012 | Engleman et al. |
| 2013/0152774 A1 | 6/2013 | Gonzalez |
| 2013/0319215 A1 | 12/2013 | Parida et al. |
| 2014/0310938 A1 | 10/2014 | Parida et al. |
| 2014/0311330 A1 | 10/2014 | Parida et al. |
| 2014/0318357 A1 | 10/2014 | Parida et al. |

FOREIGN PATENT DOCUMENTS

| | | |
|---|---|---|
| JP | 2007231241 | 9/2007 |
| WO | WO 2011/059471 A1 | 5/2011 |

OTHER PUBLICATIONS

Written Opinion of the International Searching Authority for International Application No. PCT/US2012/058420 mailed Jul. 1, 2013 (five (5) pages).

Written Opinion of the International Searching Authority for International Application No. PCT/US2013/57816 mailed Nov. 15, 2013 (nine (9) pages).

Written Opinion of the International Searching Authority for International Application No. PCT/US2013/57814 mailed May 2, 2014 (four (4) pages).

Written Opinion of the International Searching Authority for International Application No. PCT/US2013/57821 mailed May 2, 2014 (seven (7) pages).

Jauffres et al., "Microstructural origin of physical and mechanical properties of ultra high molecular weight polyethylene processed by high velocity compaction", Elsevier Ltd. Polymer 48, pp. 6374-6383.

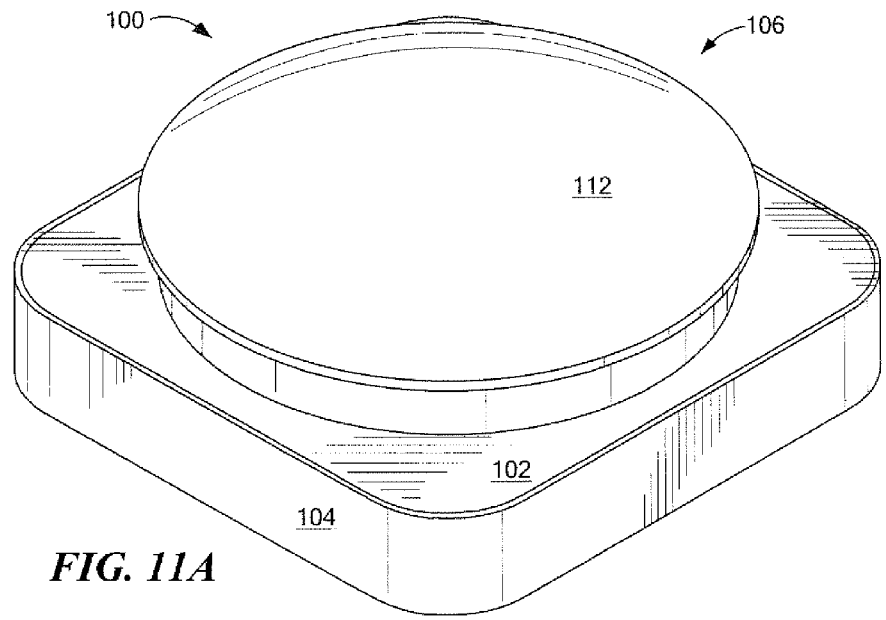
FIG. 11A
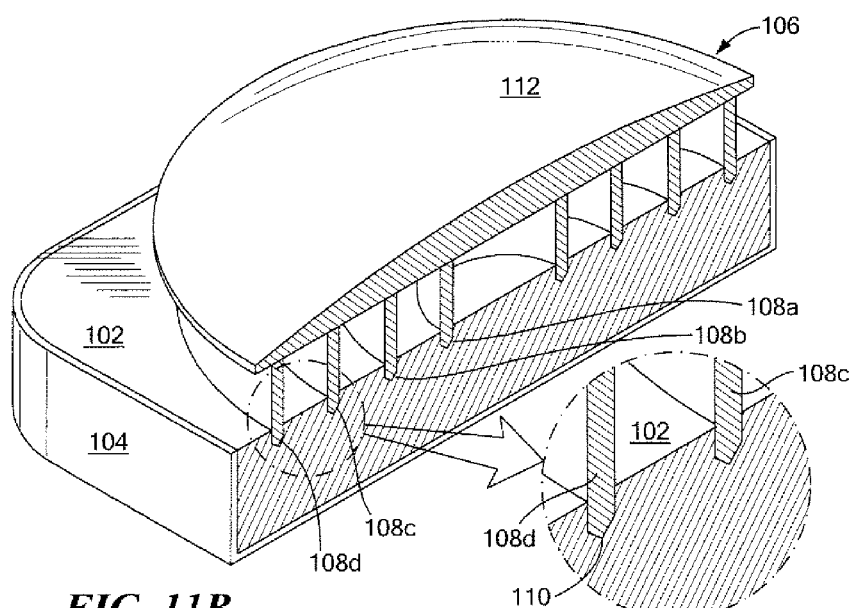
FIG. 11B  FIG. 11C

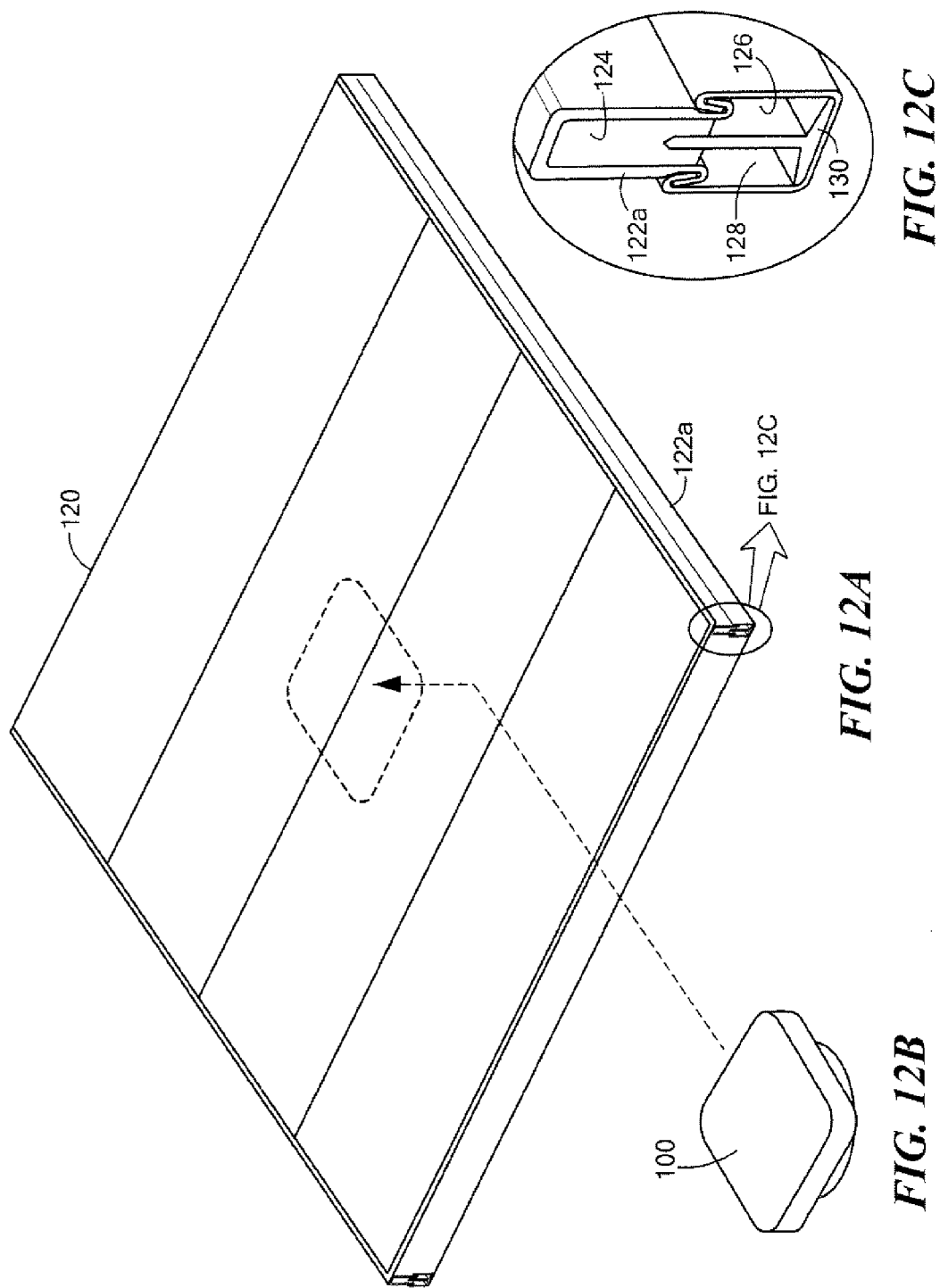

SHOCK ENERGY ABSORBER

RELATED APPLICATIONS

This application is a divisional application of U.S. patent application Ser. No. 13/385,486 filed Feb. 22, 2012, and claims benefit of and priority thereto under 35 U.S.C. §§119, 120, 363, 365 and 37 C.F.R. §§1.55 and 1.78, which is incorporated herein by reference, and Ser. No. 13/385,486 is a continuation-in-part application of U.S. patent application Ser. No. 12/925,354 filed Oct. 19, 2010 which claims the benefit of and priority to U.S. Provisional Application Ser. No. 61/281,314 filed on Nov. 16, 2009, each of which is incorporated herein by reference, under 35 U.S.C. §§119, 120, 363, 365, and 37 C.F.R. §1.55 and §1.78.

FIELD OF THE INVENTION

The subject invention relates to energy absorption.

BACKGROUND OF THE INVENTION

Generally, shock absorbers are oleo type or oleo-pneumatic type in which the oil is forced to pass through a plurality of orifices within a cylinder-piston arrangement under increasing pressure caused by the impacting force and thereby damping out the relative motion between the cylinder and piston as well as attenuating the transmitted force magnitude. Alternative shock absorbers may use a thin-walled hollow cylinder which crumples and absorbs energy under impact condition. The physical dimensions of such shock absorbers greatly increase in proportion to the magnitude of the impacting force and/or the kinetic energy to be absorbed. For use in crash energy management system related to vehicular crashworthiness and occupant safety, very little space may be available to accommodate these conventional shock absorbers.

BRIEF SUMMARY OF THE INVENTION

This disclosure provides a new concept for a compact shock energy absorber system which can be effectively used for shock mitigation. On the basis of a series of laboratory tests and a prototype test performed by the inventors, it is concluded that a significant amount of energy can be absorbed in an impact, explosive blast, or crash event by the present invention. Additionally, this class of shock absorption system can be scaled up or down and optimized to meet a wide range of impact energy management scenarios that can be achieved at much lower cost and very little or no maintenance effort, compared to alternative energy absorption systems.

The shock energy absorber system described herein can be optimized to limit the magnitude of peak dynamic force by proper tailoring of geometric dimensions and by efficiently absorbing the available kinetic energy of the impacting body within very limited space. This shock energy absorber can potentially mitigate or minimize the severity of damage to property and injury to occupants in a vehicular crash or impact event.

Examples of the invention provide a new type of shock absorber system that utilizes a novel design and a unique elastic-plastic deformation behavior of Ultra High Molecular Weight (UHMW) Polyethylene or similar materials within a confined space when subjected to compressive impact force. It permits rapid absorption of kinetic energy and limits the impacting force magnitude through the energy absorption process. Examples include an innovative use of a solid state damping material that is available in various grades as Ultra High Molecular Weight Poly-Ethylene (UHMW-PE).

Traditionally, Ultra High Molecular Weight Poly-Ethylene (UHMW-PE) and High Density Poly-Ethylene (HDPE) materials have been extensively used in applications where low friction coefficient and high wear resistance are of paramount importance. In some instances, UHMW-PE extruded sections and beams have also been used as buffers such as in water transportation system docks and locks because of their high flexural stiffness against lateral impact. Polymeric ballistic material comprising a high molecular weight, high density polyethylene (HMW-HDPE) and articles made from this ballistic material have been found suitable for stopping ballistic projectiles. See also U.S. Patent Application Publication No. 2006/0013977 incorporated herein by this reference.

The inventors have explored and innovatively used cylindrical UHMW-PE bars confined within a metallic cylinder (e.g., steel) or cylinder made of composite material for absorption of kinetic energy of an impacting plunger with a conical front. This is intended to be used with appropriate scaling and optimized configuration as a part of proposed Crash Energy Management (CEM) system for locomotive crashworthiness applications. Other potential applications may include other land vehicles such as automobiles and watercraft.

Preliminary investigation including quasi-static testing of UHMW-PE cylindrical bar in a compression test machine offered promising results and insight into existence of two distinctly different regimes of deformation behavior under compression loading. Computation of energy absorption from force versus displacement curves of quasi-static tests exhibited potential for its application as a crash energy absorber, provided its high strain rate response behavior under high speed impact condition is equally promising. In order to evaluate this, a "Pendulum Impact Test" was also performed and the test data generated at an impact velocity of about 17 feet per second supported the concept of effective high energy shock absorption with very little axial deformation of the UHMW-PE material. Additional testing was also conducted.

Featured is a shock absorber comprising damping material in a solid state and which transitions from a solid to a viscous fluid state when stressed in compression. A plunger device includes a depending blade positioned in or adjacent the damping material to be driven into the damping material when impacted transitioning the damping material to a viscous fluid state absorbing the impact.

In one example, the plunger further includes a plurality of concentric depending blades. The plunger may include a face plate and concentric round blades depending from the face place. There may also be a rail containing the damping material. In one example, the rail plunger is then configured as a beam with a linear blade depending from a top plate.

In one embodiment, an outer cylinder wall is lined with the damping material, the plunger device includes an inner cylinder having a wall terminating in the depending blade. In one version, the inner cylinder wall is also lined with the damping material. An end cap plunger may have a depending blade in or adjacent the damping material lining the inner cylinder wall, a damping material confinement wall depending from the end cap, and a strut depends from the end cap inside the confinement wall.

Also featured is a shock absorbing structure comprising a platform including damping material in a solid state which transitions from the solid state to a viscous fluid state when stressed. A plunger includes a face plate, and concentric blades depending from the face plate in or adjacent the damping material to be driven into the damping material when impacted transitioning the damping material to a viscous fluid state absorbing the impact.

The platform may be in the form of a drop platform. In another version, the platform includes a blast shield securable to the under side of a vehicle.

A drop platform in accordance with example of the invention includes a bottom surface and damping material in a solid state and which transitions from a solid state to a viscous fluid state when stressed on the bottom surface. A plunger includes a face plate, and concentric blades depending from the face plate in or adjacent the damping material to be driven into the damping material when impacted transitioning the damping material to a viscous fluid state absorbing the impact. One or more side rails each include damping material in a solid state and which transitions from a solid state to a viscous fluid state when stressed, and a plunger configured a beam with a blade depending therefrom adjacent to or in the damping material to be driven into the damping material when impacted transitioning the damping material to a viscous fluid state absorbing the impact.

One shock absorber in accordance with an example of the invention features an outer cylinder wall lined with damping material in a solid state and which transitions from the solid state to a viscous fluid state when stressed and a plunger device including an inner cylinder having a wall terminating in a depending blade position in or adjacent the damping material to be driven into the damping material when impacted transitioning the damping material to a viscous fluid state absorbing the impact confinement wall depending from the end cap.

A shock absorbing method comprises positioning a plunger device including a depending blade in or adjacent damping material in a solid state but which transitions from the solid state to a viscous fluid state when stressed and, upon an impact, driving the depending blade into the damping material transitioning the damping material to a viscous fluid state to absorb the energy of the impact.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 11A is a schematic three-dimensional view showing another example of a shock absorber in accordance with the invention;

FIG. 11B is a schematic cross sectional view of the shock absorber of FIG. 11A;

FIG. 11C is a schematic view showing in more detail the annular blades of the plunger portion of the shock absorber of FIGS. 11A and 11B;

FIG. 12A is a schematic three dimensional top view showing an example of an air drop platform including shock energy absorbing features in accordance with another example of the invention;

FIG. 12B is another schematic three dimensional view of the shock absorber of FIGS. 11A and 11B showing how it is positioned with respect to the drop platform of FIG. 12A;

FIG. 12C is a schematic more detailed view showing a rail of the air drop platform of FIG. 12A;

DETAILED DESCRIPTION OF THE INVENTION

Figure 1:
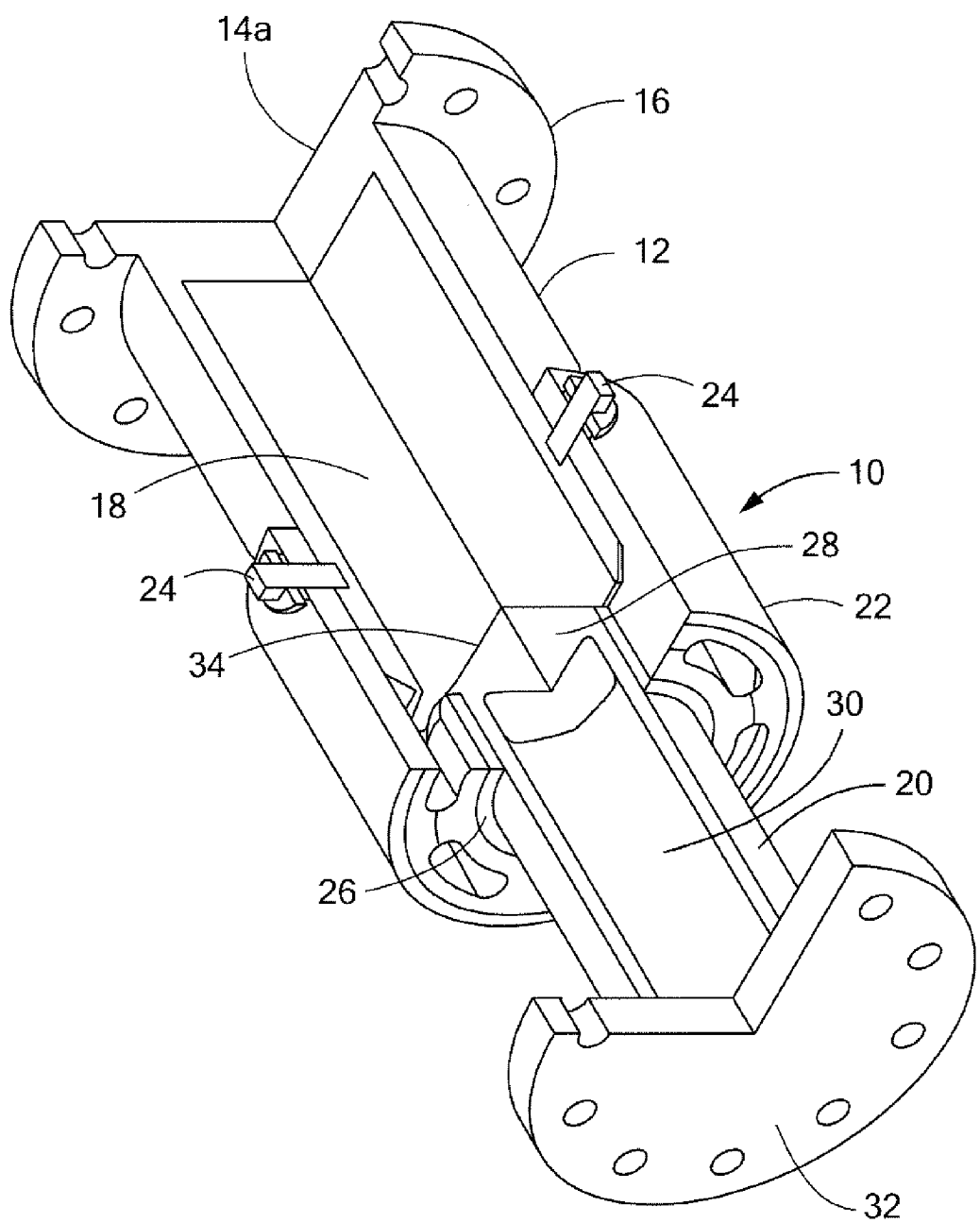
FIG. 1 is a schematic front cut away view showing an energy absorber in accordance with an example of the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
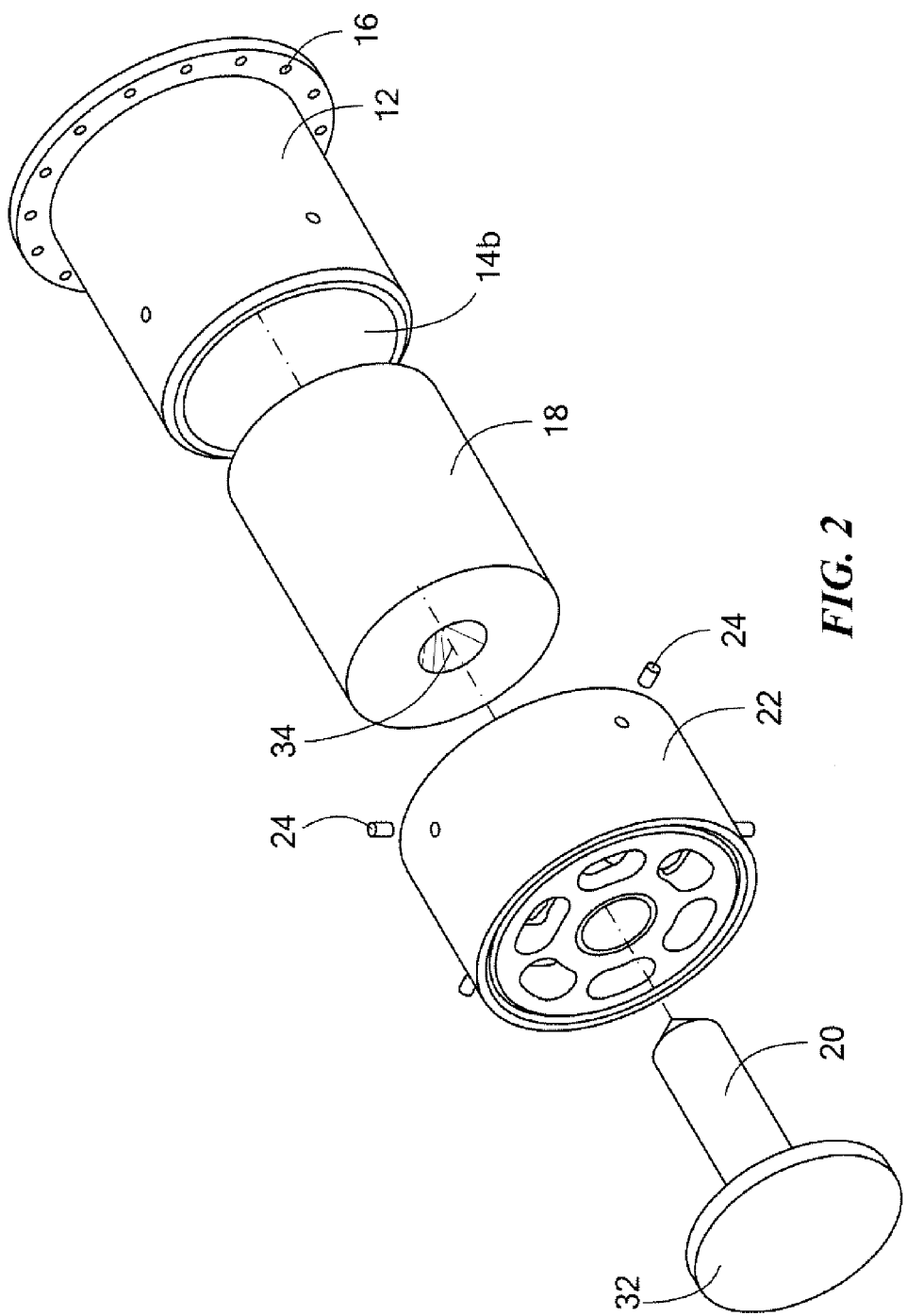
FIG. 2 is a schematic three-dimensional exploded view of the energy absorber shown in FIG. 1.

A novel compact high energy shock absorber can preferably be made of very few machined parts. The major components in one example are shown in FIGS. 1-2. Shock energy absorber 10 includes vessel 12, in this particular example, a cylinder with closed end 14a and open end 14b. In this example, flange 16 is included at closed end 14a for mounting cylinder 12 to a structure such as a locomotive or other vehicle or the bottom of an elevator shaft or the like.

Damping material 18 (e.g., UHMW-PE material) in its solid state is placed in and confined within cylinder 12. Typically, the damping material radially fills the cylinder for most of the length of the cylinder. Plunger 20 is positioned to be driven into damping material 18. In this particular example, sleeve 22 is provided and fixed about the open end of cylinder 12 via fasteners 24. Sleeve 22 includes bearing 26 about plunger 20. Plunger 20 in this example includes conical end 28, hollow shaft portion 30 (for weight reduction), and flange portion 32. Damping material 18 may include seat 34 receiving conical end 28 of plunger 20.

The cylinder is preferably made of high strength alloy steel and of seamless construction with a larger wall thickness to safely withstand a high magnitude of hoop stress. The UHMW-PE cylindrical specimen is made to snug-fit with the inner diameter of the cylinder. At the center of the UHMW-PE specimen, a small diameter through hole can be included to guide the vertex of the conical-front plunger during impact. The plunger is also made of high strength alloy steel and its dimensions are selected to leave adequate clearance between the inner diameter of cylinder and the outer diameter of the plunger. The plunger may be made of a solid steel bar or a hollow steel bar of large wall thickness. Its length should be adequate to achieve the maximum stroke or travel desired under the action of the impact force. The steel sleeve fitted with a bearing is intended to offer lateral support and guide the plunger to travel coaxially along the centerline of the UHMW-PE material upon impact. The sleeve is screwed down to the outer surface of the cylinder for adequate support and proper alignment of the axis of plunger with that of the UHMW-PE cylinder. The cylinder and the plunger can both provided with circular flanges at their bases which have provision for attachment to corresponding mating surfaces or plates with a number of fasteners. If necessary, the rear (striking) end of the plunger may be left unattached to any surface depending on the configuration of the vehicle or structure or when the plunger is required to contact directly with an impacting body.

In a typical application, the geometric dimensions of the shock energy absorber will be tailored to limit the desired highest impact force magnitude, depending on the strength of the reaction surface to which the cylinder block is mounted, and the maximum travel of the plunger commensurate with the required kinetic energy absorption. The components of the system are mounted to the required position while ensuring their proper alignment.

When the impacting body or object strikes the rear end (32, FIGS. 1-2) of the plunger with adequate momentum, its conical front-end presses hard against the UHMW-PE cylinder and penetrates it, which, in turn, offers a reaction force to decelerate the motion of the plunger. With the plunger continuing to press on against the UHMW-PE, when a critical stress magnitude is reached, the UHMW-PE material undergoes a phase transition from solid to a viscous fluid state. This phase transition occurs within a confined space and at or above a critical compressive flow stress magnitude based on the plunger area of cross-section. In one laboratory test, it has been observed to be a reversible process in that upon releasing the high stress magnitude, the viscous UHMW-PE material regains its solid state. Upon impact, the plunger with the conical front penetrates into the front end of the UHMW-PE cylinder. With the increasing impact force magnitude, the UHMW-PE material undergoes phase transition at or above the critical flow stress. As the UHMW-PE material ahead of the plunger transitions into viscous fluid state, the resisting force on plunger drops sharply to a lower value. The plunger would then continue to move with a gradual further rise in force magnitude until the end of the plunger's travel is reached or until the impact energy is absorbed. The maximum impact force experienced by the structure supporting the cylinder may be slightly more than that developed by the plunger corresponding to the critical stress of the UHMW-PE material used. Total energy absorbed by the shock energy absorber during the impact would be nearly equal to the work done by the plunger on the UHMW-PE cylinder.

This shock energy absorption system embodies a new concept and is presently not known to be used by any industry. The compact system requires less space to accommodate it and less travel distance of the plunger to absorb a high amount of impact energy. It offers scope for dimensional optimization to limit the desired peak impact force magnitude. It utilizes a low cost, UV-resistant solid UHMW-PE or similar material for shock absorption. In real life applications, an installed unit requires very little or no maintenance over long time period without any risk of leaking hydraulic fluid as in some alternative shock absorption systems.

The inventors performed a compression test using an INSTRON Model 8502 servo-hydraulic test machine. The test specimen was a 2.5 in diameter UHMW-PE solid bar inserted inside a seamless steel cylinder that was mounted over the actuator of INSTRON test machine. The initial plunger was a conical front 2.0 in diameter steel plunger, which failed to penetrate the UHMW-PE specimen even at safe machine load capacity of 50 kilo-pound (kip), although it made a dimpled impression on the specimen surface. The inventors replaced the conical front plunger with a fully threaded 1.0 in diameter and 3.0 in long flat-ended steel bar that was readily available and performed the compression test on the same test specimen. During the test, it was noted that initially the compression force gradually increased with threaded bar displacement into the UHMW-PE cylinder up to about 1.0 inch when the force magnitude was approximately 20 kip. Beyond that point the force magnitude almost remained constant with increasing displacement of the threaded bar. The test was stopped at a maximum displacement of about 1.7 inches and the test specimen was unloaded. Later, the inventors tried unsuccessfully to remove the threaded bar from the UHMW-PE specimen. The UHMW-PE cylinder was then cut open along a diametric plane on its back face to remove the threaded bar. After cutting the UHMW-PE cylinder into two halves, the threaded bar popped out of the groove revealing thread impressions inside the groove in both halves of the UHMW-PE cylinder.

Figure 3:
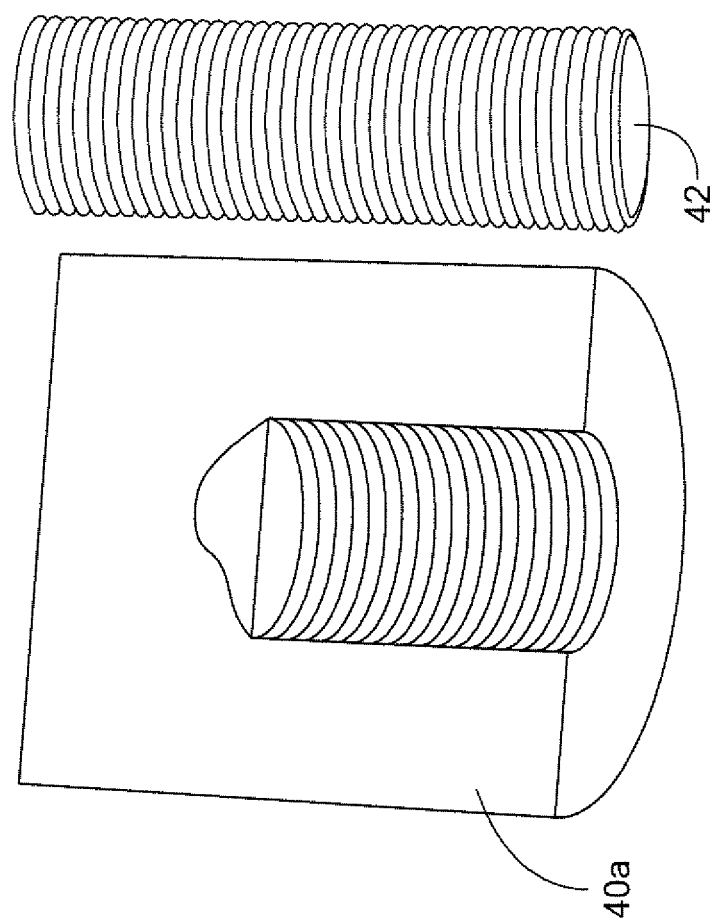
FIG. 3 is a depiction of two halves of a UHMW-PE cylinder tested with a flat-ended threaded steel bar.

FIG. 3 shows the two halves 40a and 40b of the UHMW-PE cylinder, including the thread impressions inside the grooves and the flat-ended threaded steel bar 42 used in the above test.

From FIG. 3 it is seen that there are solidified UHMW-PE material deposit in the shape of raised triangular mass just ahead of the end-position of the flat-ended steel bar. This raised triangular UHMW-PE material is seen in both halves of the cut-cylinder, which shows clear evidence of later local oozing out, solidification, and increase in volume of viscous-state UHMW-PE material after the cylinder was cut open. The thread impressions in both halves are also suggestive of a softer viscous state of the core material adjacent to the threaded steel bar that was "locked-in-place" and that solidified following the removal of load in the test machine.

Figure 4:
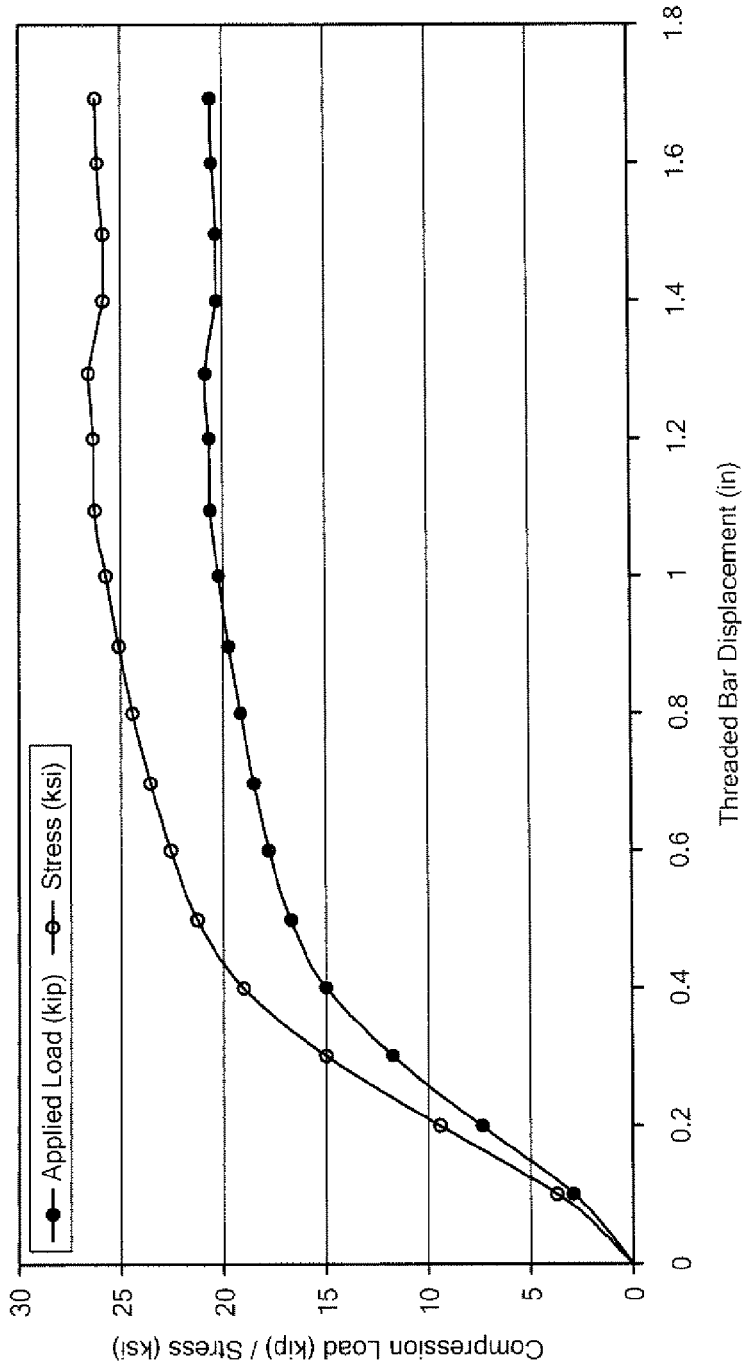
FIG. 4 is a graph showing compression load and stress variation with bar displacement for the test device shown in FIG. 3.

FIG. 4 shows graphical representation of the above test results plotted as compression load and compression stress versus the displacement of the threaded bar into the UHMW- PE cylinder. These graphs show that beyond approximately 20 kip load or about 25 ksi stress, the core UHMW-PE material did not offer further increasing resistance and the subsequent displacement of the threaded bar took place at almost the same compressive load/stress level, associated with the phase transition of the highly stressed UHMW-PE core material. The compression stress magnitude mentioned here is based on the cross-sectional area of the plunger.

Figure 5:
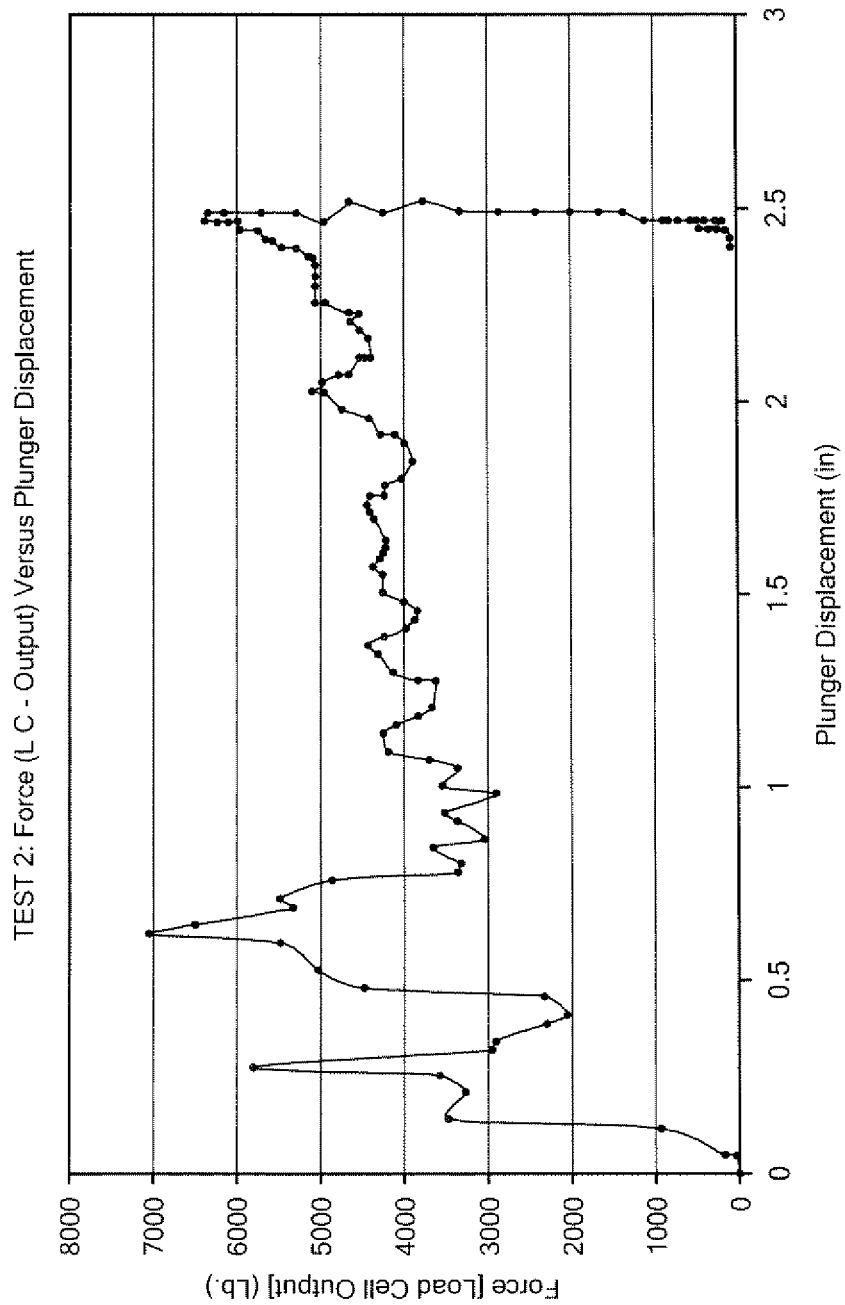
FIG. 5 is a graph showing the variation of instantaneous compression force with plunger displacement for a pendulum impact test unit during impact at 17.14 feet per second.

FIG. 5 shows a graphical representation of the dynamic force versus plunger displacement obtained from a typical impact test conducted at 17.14 feet per second impact velocity.

A prototype unit similar to FIGS. 1-2 was also fabricated and tested. The diameter of damping material 18 was 9.5" and the plunger 30 had a diameter of 3".

Figure 6A:
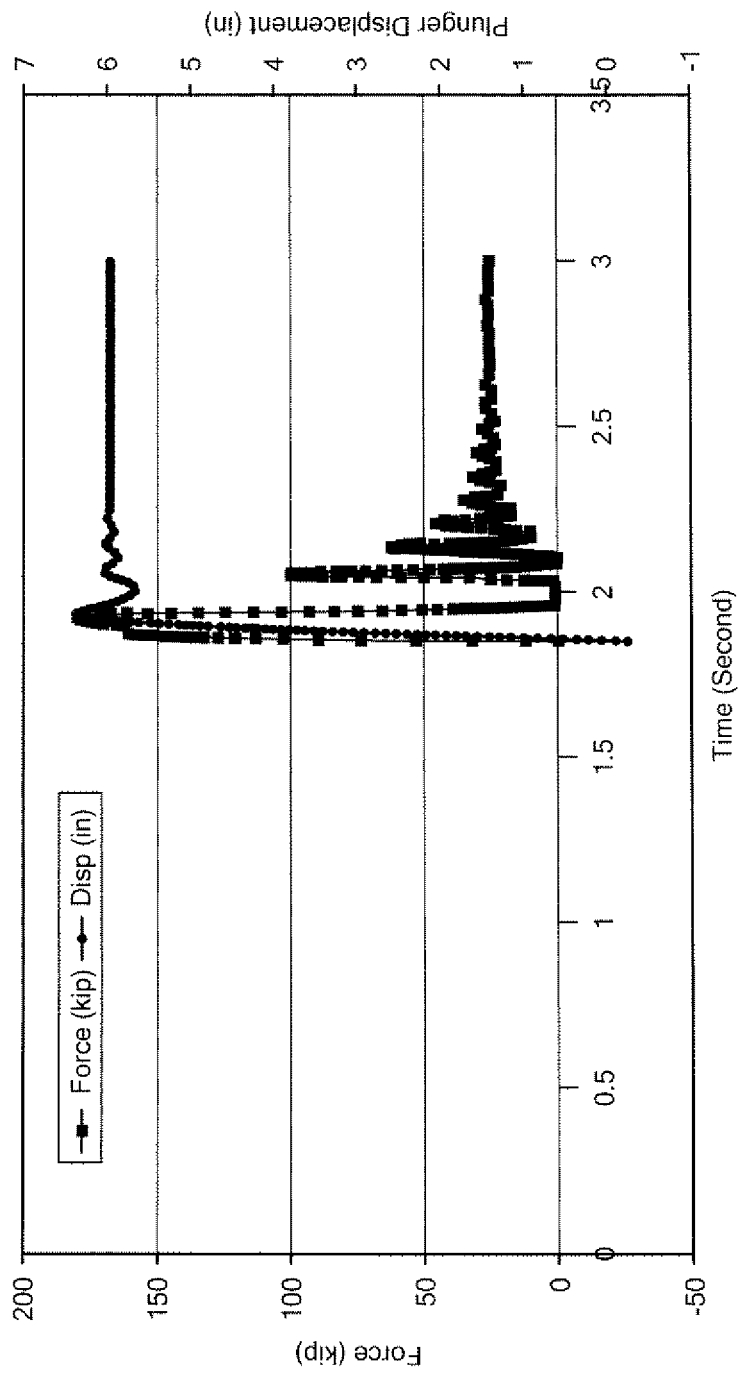
FIG. 6A is a force and plunger displacement graph versus time for a 30" drop of a 27 kip hammer in a test using a prototype shock energy absorber as shown in FIGS. 1 and 2.
Figure 6B:
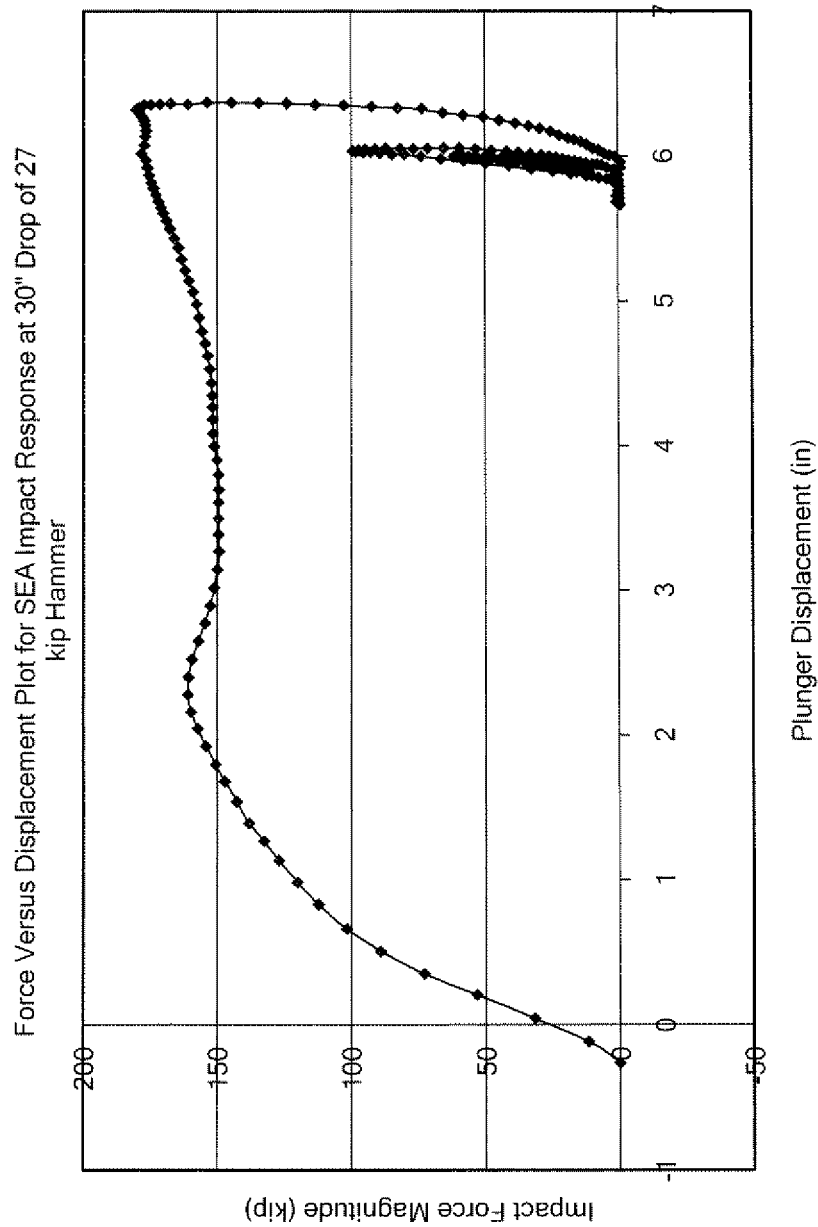
FIG. 6B is a graph showing plunger displacement as a function of impact force magnitude for the prototype shock energy absorber of FIGS. 1 and 2.

FIG. 6A shows force and plunger displacement as a function of time for 30" drop of a 27 kip hammer testing device impacting flange end 32 of plunger 20. A reversible phase transition of the damping material was clearly observed. The peak force was approximately 180 kips and the kinetic energy absorbed was approximately 82,260 ft-lb. As shown in FIG. 6B the phase transition of the UHMW-PE material occurred at approximately 2 inches of plunger displacement. By scaling the shock energy absorber, it is possible to tailor the peak crash energy absorption up to any desired value. The cylinder serves as a compression vessel for the UHMW-PE material. Important design criteria include the impact velocity, the cross-sectional area of the damping material, and the plunger diameter.

Figure 7:
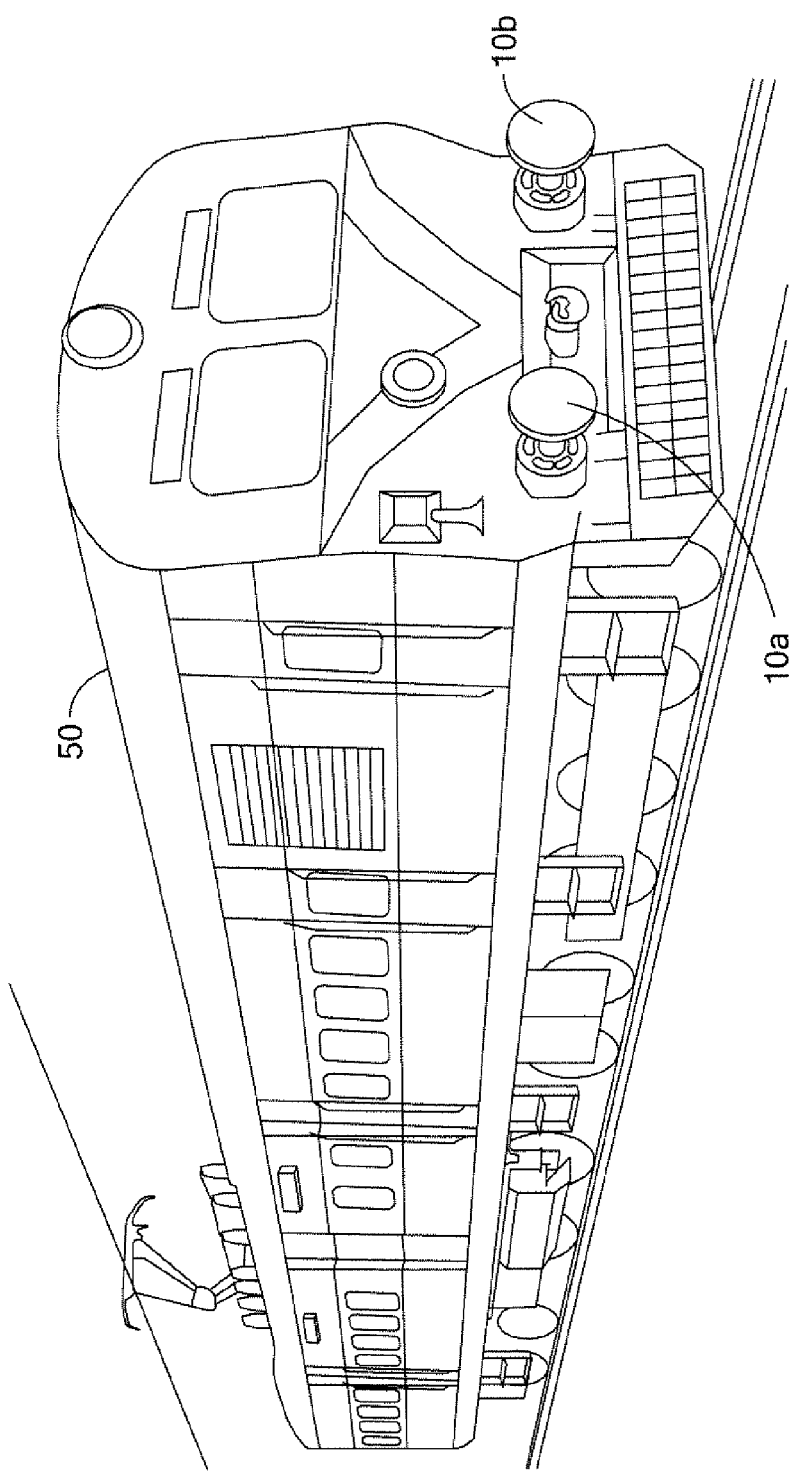
FIG. 7 is a schematic three-dimensional view showing an example of two shock energy absorbers mounted to a locomotive.

FIG. 7 shows two larger shock absorbers 10a and 10b of the type depicted in FIGS. 1 and 2 attached to locomotive 50. Other uses for the shock absorber include end of rail track buffers, crash energy absorbers at the bottom of elevator shafts, use in rail tank cars to prevent puncture of a tank in the event of a collision and/or derailment, shock absorbers used in conjunction with road tankers and hazmat carrying trucks, and chassis front end shock absorbers of automobiles and transit buses. In all examples, a significant amount of energy is absorbed due to the transition of the damping material from a solid to a viscous fluid and the consequent plunger displacement.

In general, vessel 12 and/or plunger 32 is fixed to a structure. The plunger is driven into the damping material by moving the plunger and the shock absorber to strike an object or by moving an object to strike the structure and the shock absorber. When this occurs, the damping material changes from a solid state to a viscous fluid state and absorbs the energy associated with the impact. Alternatively, a shock absorber can be mounted between two objects or structures.

Figure 8:
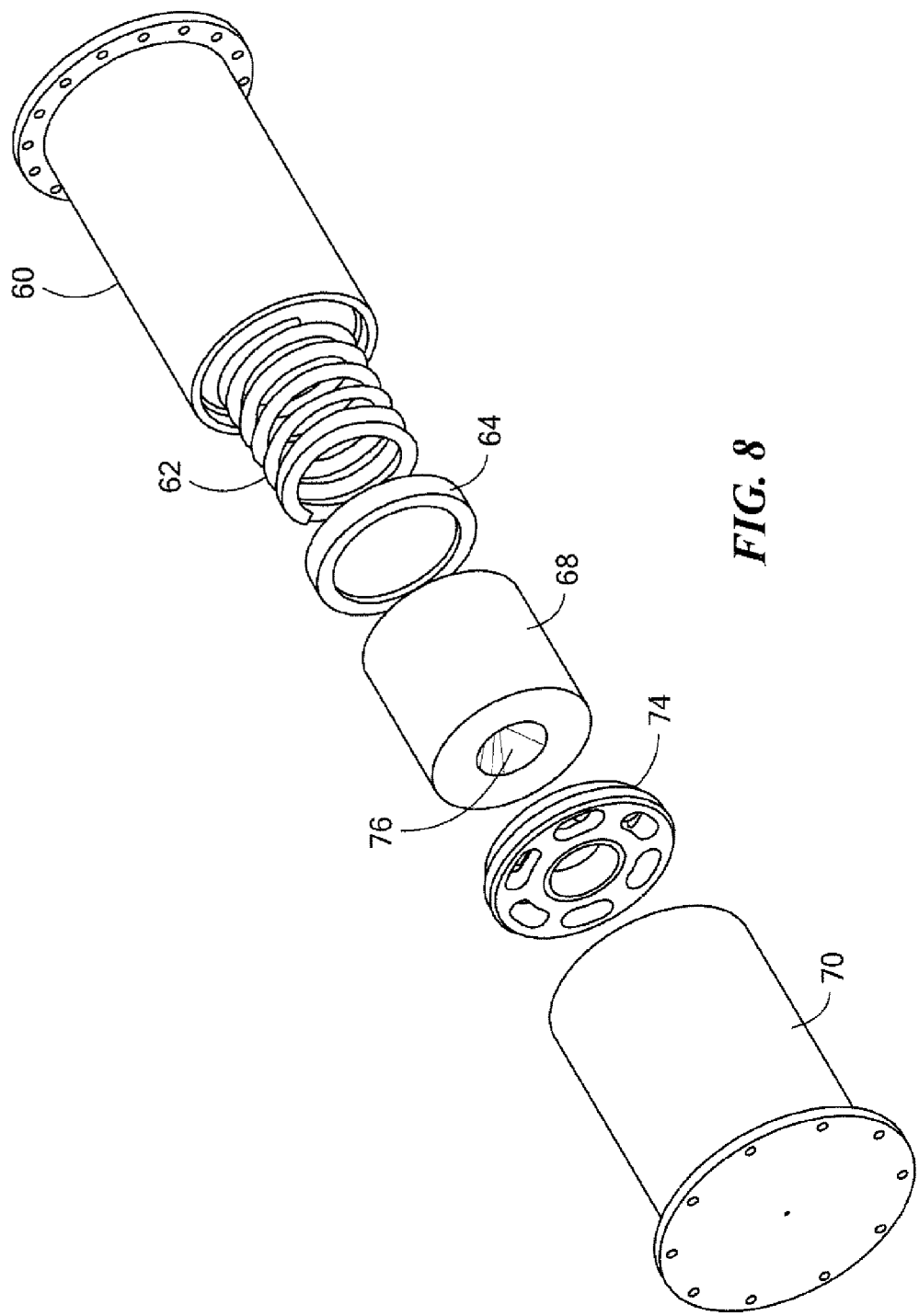
FIG. 8 is an exploded three-dimensional view showing another example of a shock energy absorber system in accordance with an example of the invention.
Figure 9:
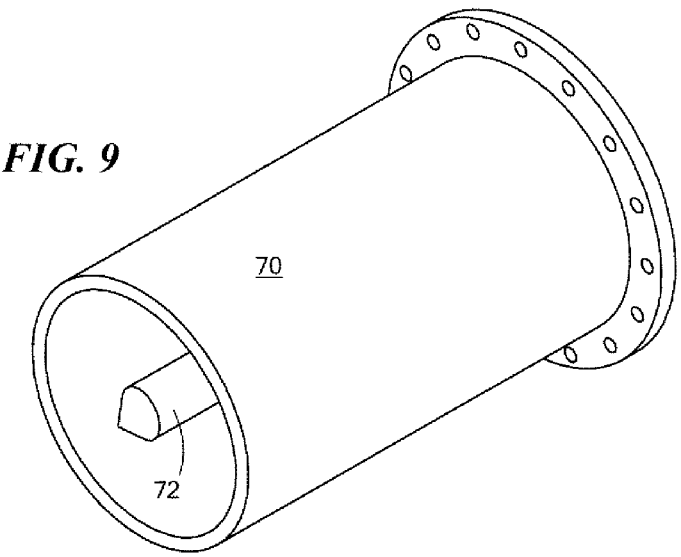
FIG. 9 is a schematic three-dimensional view showing the interior of the plunger assembly of FIG. 8.
Figure 10:
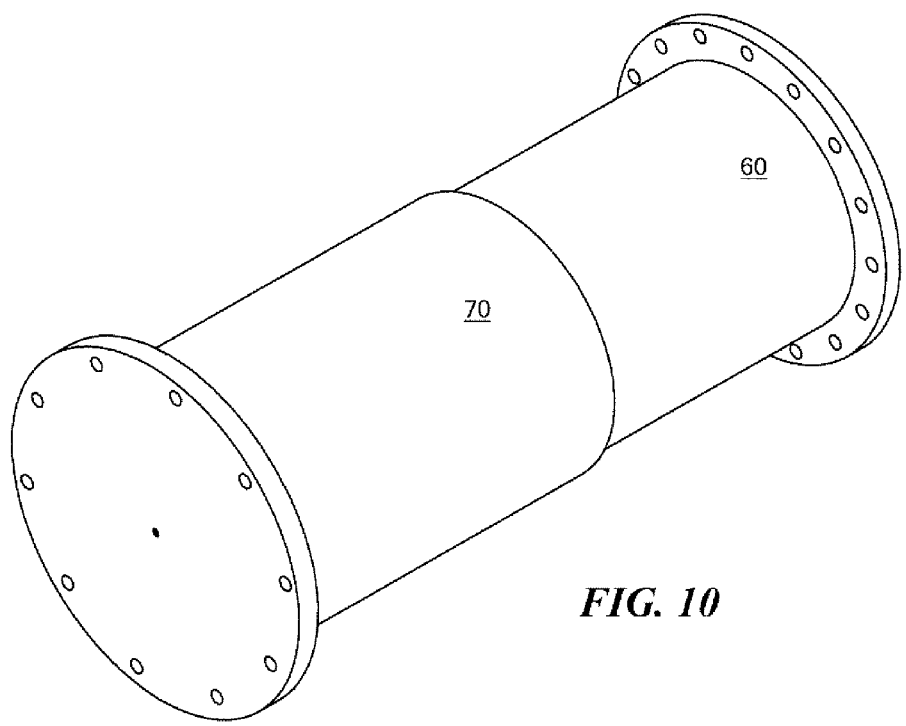
FIG. 10 is a schematic three-dimensional view showing the shock absorber of FIG. 8 in its assembled state.

FIG. 8 shows another design including cylinder 60 housing spring 62, buffer plate 64, and damping material 68 therein. Plunger assembly 70, also shown in FIG. 9, includes plunger 72 positioned to be driven into damping material 68 via bearing sleeve assembly 74, FIG. 8. Again, damping material 68 may include seat 76. FIG. 10 shows the assembled shock energy absorber unit where plunger assembly 70 is coupled over cylinder 60 and plunger 72, FIG. 9 now abuts damping material 68, FIG. 8.

Shock absorber 100 in accordance with another example with of the invention includes damping material 102 in a solid state and which, as described above, transitions from a solid to a viscous fluid state when stressed in compression. Examples include ultrahigh molecular weight polyethylene, HDPE, and equivalents thereof. A constraining frame 104 is optional in the particular example depicted. Plunger device 106 includes depending blades 108a-108b as shown in FIGS. 11B and 11C. The blades typically terminate in pointed knife portion 110 as shown for blade 108d, FIG. 11C positioned or closely adjacent to damping material 102. Plunger 106 is impacted and the blades are driven into the damping material transitioning it from a solid to a viscous fluid state absorbing the energy of the impact through work done by the plunger. As opposed to a solid plunger as depicted with respect to FIGS. 1 and 2, the round concentric series of blades 108a-108d which depend downward from face plate 112 of plunger 106 are lighter in weight and serve to constrain flow of material 102 to the space between adjacent blades. In one embodiment, shock absorber 100 is positioned underneath and approximately in the center of air drop platform 120, FIG. 12A. The damping material is secured to the bottom of the drop platform with a plunger facing downward toward the ground. The plunger does not have to have to be domed, nor does it have to be inclusive of a drop platform.

FIG. 12C shows how platform rail 122a may include damping material 124. Here, the plunger is configured as beam 126 with linear blade 128 depending from top plate 130.

Figure 13A:
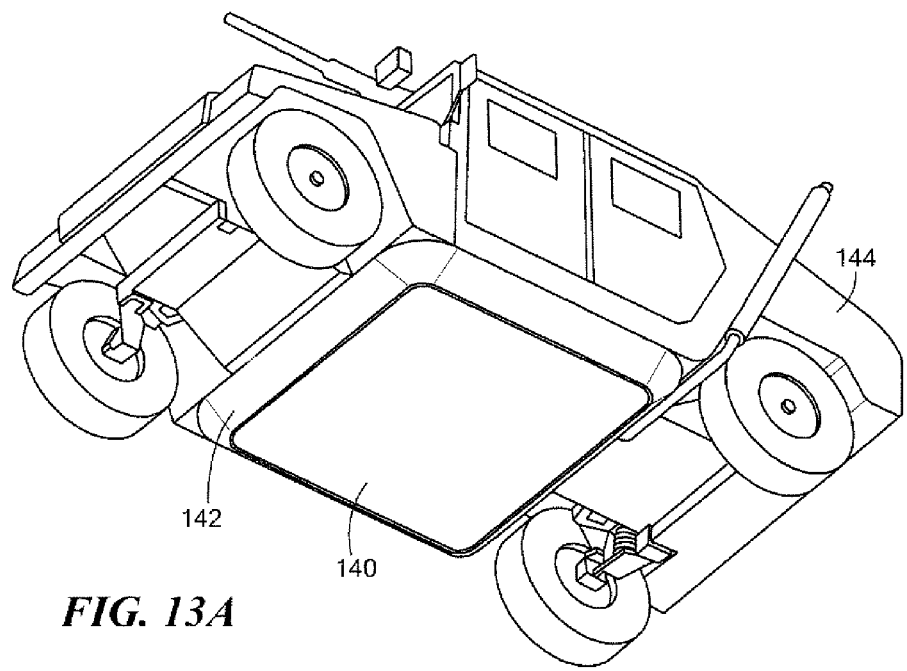
FIGS. 13A and 13B are schematic views showing other examples of a shock energy absorber attached to the bottom of a military vehicle in the form of a blast shield.
Figure 13B:
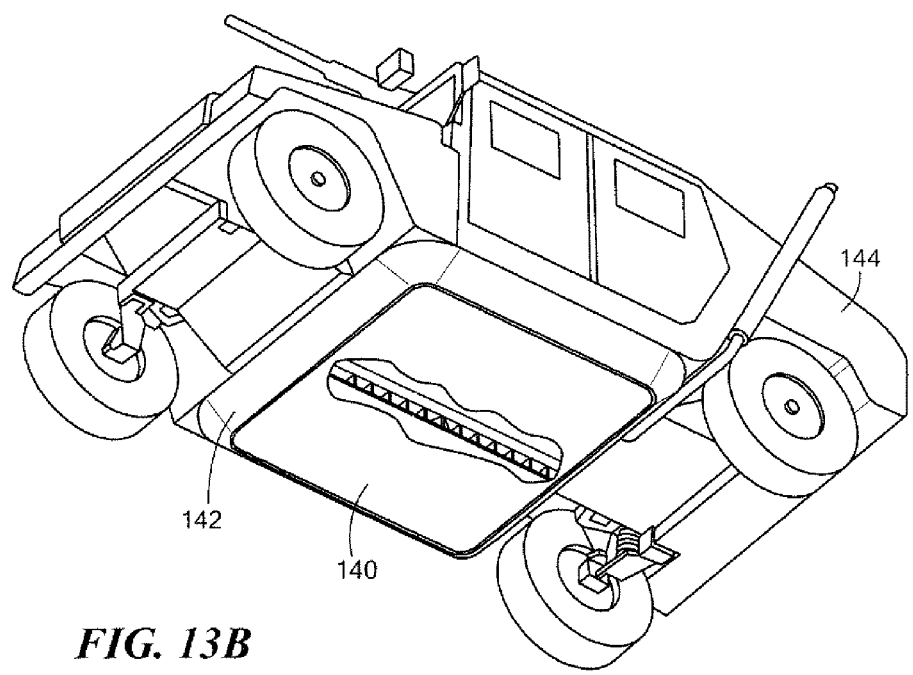

In still another example, blast shield 140, FIG. 13A includes a plate like structure made up of the damping material discussed above optionally within a frame as shown at 142 secured to the under carriage of military vehicle 144. Another example, shown, FIG. 13B of the same under carriage configuration could include a rectangular pattern as opposed to a circular (annular) configuration of blades radiating outward from the center as depicted in FIG. 11A in a sandwich construction containing armor plate, damping material, annular blades and blast shield. In one embodiment, shock absorber 100, FIG. 11A is placed between the vehicle frame and optional blast shield 140 in its center. In other designs, more than one shock absorber 100 is depicted in FIG. 11A circular or rectangular in configuration may be placed between the vehicle frame and blast shield 140.

Figure 14A:
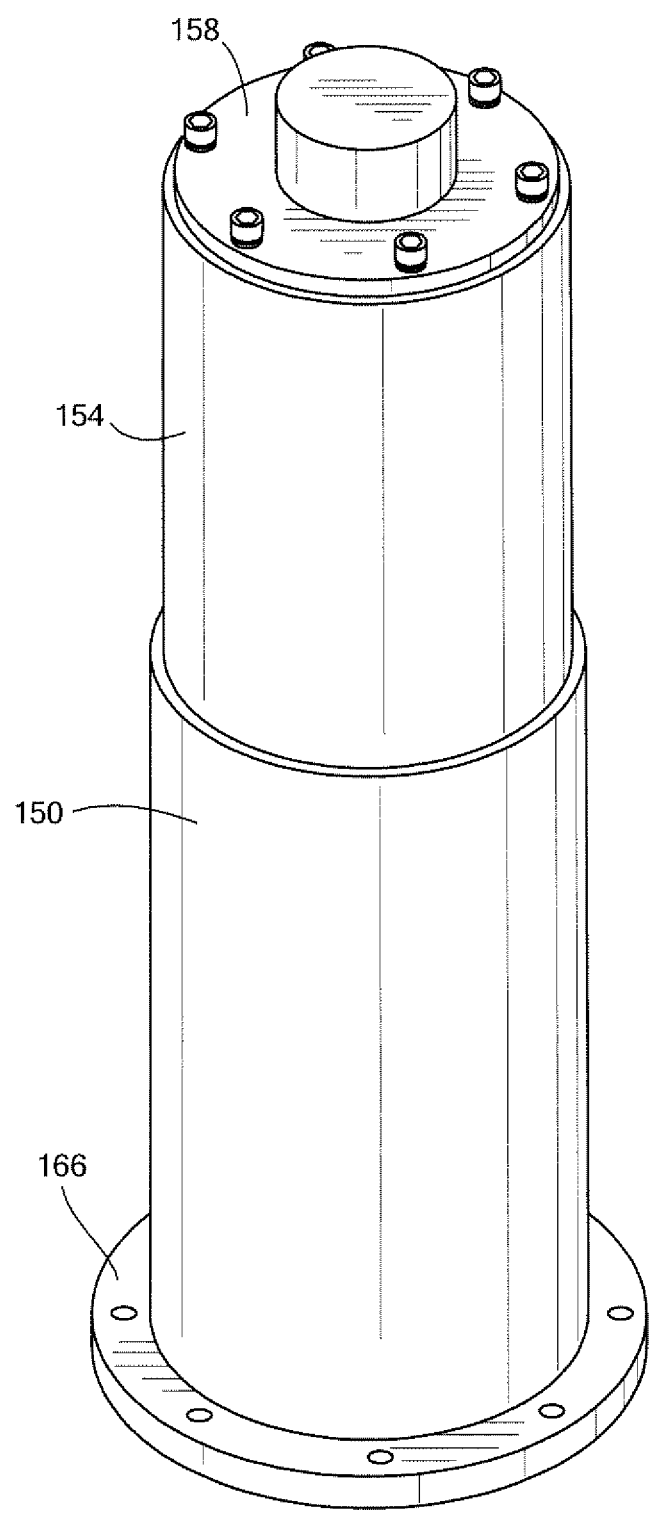
FIG. 14A is a schematic three dimensional front view showing still another example of a shock absorber in accordance with the invention.
Figures 14B, 14C:
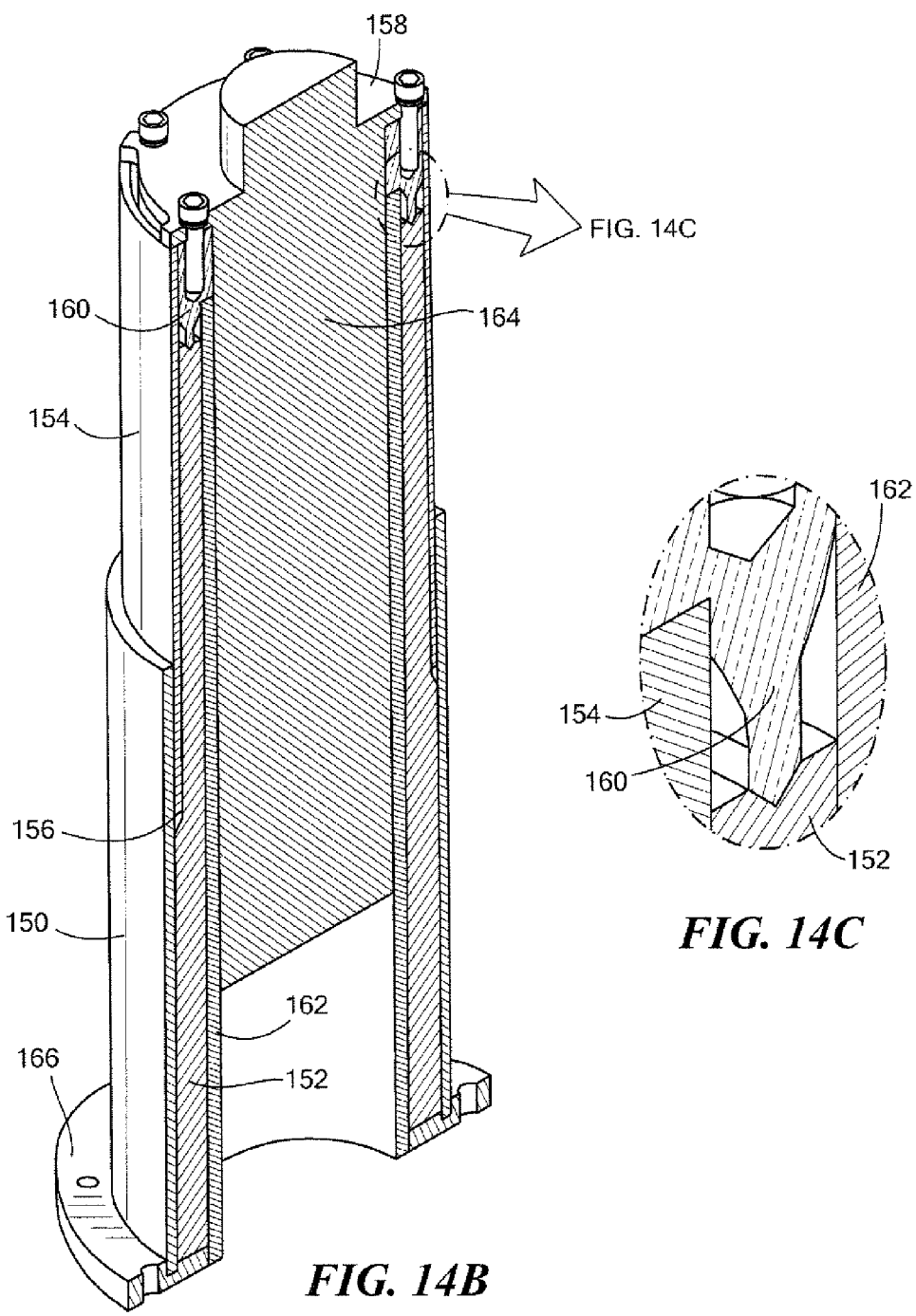
FIG. 14B is a schematic cut away view of the shock absorber of FIG. 14A.
FIG. 14C is a more detailed view showing a portion of the shock absorber of FIG. 14B.

FIGS. 14A-14C show a design where outer cylinder telescoping walls 150 & 154 with damping material 152 sandwiched in between the inner sliding confinement cylinder 162 which depends downward from the circular blade 160 which travels together during compression. Here the plunger device includes inner telescoping cylinder wall 154 terminating in depending blade 156. In this example, the strut when acted upon by a force exceeding its capacity depend downward acting upon the circular blade 160 and the inner telescoping cylinder 154. The depending blade 156 which is in contact with the damping material 152 begins to compress the damping material 152 and being confined by the outer telescoping cylinder walls and the inner sliding confinement cylinder. The design is such that upon impact circular knife edge 156 typically driven into the damping material before circular knife edge 160 is driven into damping material due to difference of area under respective knife edges. The combined effect of both, cause the damping material to go into phase change in different areas of the damping material column. In another example the inner confinement cylinder could be telescoping. Preferably, inner cylinder wall 154 is also lined with the damping material as shown and end cap plunger 158 includes depending circular blade 160 adjacent a top edge of the damping material 152 lining inner cylinder wall 154. In this example, damping material confinement wall 162 depends downward from end cap structure 158 which also includes a strut 164 positioned within confinement wall 162. In some examples, confinement wall 162 may terminate some distance from collar structure 166 which contains the distal end of outer cylinder wall 150 and which also supports damping material 152. The design is such that upon impact circular knife edge 156 typically driven into the damping material before circular knife edge 160 is driven into the damping material.

Linear strip type plungers with a knife edge, annular plungers with a knife edge, are thus configured to impact the damping material typically enclosed within a confined space, because concentric blades being circular or rectangular in pattern create a confinement during compression.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A shock absorber comprising:
   an outer cylinder wall lined with damping material in a solid state and which transitions from the solid state to a viscous fluid state when stressed in compression; and
   a plunger device including:
      an inner cylinder lined with said damping material and having a wall terminating in a depending blade positioned in or adjacent the damping material to be driven into the damping material when the plunger device is impacted transitioning the damping material to a viscous fluid state absorbing the impact; and
      a damping material confinement cylinder wall confining the damping material between said confinement cylinder wall and the outer cylinder wall.

2. The shock absorber of claim 1 further including an end cap plunger with a depending blade in or adjacent the damping material lining said inner cylinder wall.

3. The shock absorber of claim 2 in which the damping material confinement cylinder wall depends from said end cap plunger.

4. The shock absorber of claim 3 further including a strut within the confinement cylinder.

5. A shock absorber comprising:
   an outer cylinder wall lined with damping material in a solid state and which transitions from the solid state to a viscous fluid state when stressed in compression;
   a plunger device including:
      an inner cylinder having a wall lined with the damping material and terminating in a depending blade positioned in or adjacent the damping material to be driven into the damping material when the plunger device is impacted transitioning the damping material to a viscous fluid state absorbing the impact; and
      a damping material confinement cylinder wall confining the damping material between said confinement cylinder wall and the outer cylinder wall; and
   an end cap plunger with a depending blade in or adjacent the damping material lining the inner cylinder wall to be driven into the inner cylinder wall damping material when the end cap plunger is impacted.

6. The shock absorber of claim 5 further including a strut within the confinement cylinder wall.

\* \* \* \* \*